US006931704B1

(12) United States Patent
Tanner

(10) Patent No.: US 6,931,704 B1
(45) Date of Patent: Aug. 23, 2005

(54) ENGINE VALVE LIFTER LIFTING TOOL

(76) Inventor: Richard Tanner, 6300 Skylark, Watauga, TX (US) 76148

( * ) Notice: Subject to any disclaimer, the term of this patent is extended or adjusted under 35 U.S.C. 154(b) by 0 days.

(21) Appl. No.: 10/675,272

(22) Filed: Sep. 30, 2003

(51) Int. Cl.[7] .......... B23P 19/04
(52) U.S. Cl. .......... 29/213.1
(58) Field of Search .......... 294/65.5; 29/213.1, 29/279, 280, 282, 214, 215, 888.42, 218, 29/219

(56) References Cited

U.S. PATENT DOCUMENTS 4,575,913 A 3/1986 Sugiuchi et al.
5,724,860 A 3/1998 Sekiguchi et al.
6,125,537 A 10/2000 Kuehl
6,321,626 B1 * 11/2001 Liu .......... 294/65.5

* cited by examiner

*Primary Examiner*—Robert C. Watson

(57) ABSTRACT

An engine valve lifter lifting tool for lifting valves to clear a camshaft such that the camshaft is replaceable without having to remove the intake manifold includes a plate having a plurality of rods each snugly inserted through a respective alignment tube to permit selective positioning of each rod within the respective alignment tube. Each rod includes a magnet to engage one of the valve lifters to hold the lifter clear of the camshaft. A respective plunger assembly is attached to each rod to detach the lifter from the magnet.

15 Claims, 2 Drawing Sheets

ENGINE VALVE LIFTER LIFTING TOOL

BACKGROUND OF THE INVENTION

1. Field of the Invention

The present invention relates to engine repair tools and more particularly pertains to a new engine valve lifter lifting tool for lifting valves to clear a camshaft such that the camshaft is replaceable without having to remove the intake manifold.

2. Description of the Prior Art

The use of engine repair tools is known in the prior art. Examples of engine repair tools related to engine camshafts include U.S. Pat. No. 4,575,913; U.S. Pat. No. 5,724,860; and U.S. Pat. No. 6,125,537.

While these devices fulfill their respective, particular objectives and requirements, the need remains for a device that will lift all engine valves to provide clearance from a camshaft to allow replacement of the camshaft without having to remove the intake manifold of the engine.

SUMMARY OF THE INVENTION

The present invention meets the needs presented above by providing a plate having a plurality of rods each snugly inserted through a respective alignment tube to permit selective positioning of each rod within the respective alignment tube. Each rod includes a magnet to engage one of the valve lifters to hold the lifter clear of the camshaft. A respective plunger assembly is attached to each rod to detach the lifter from the magnet.

An object of the present invention is to provide a new engine valve lifter lifting tool that permits replacement of a camshaft without having to remove the intake manifold of an engine.

Another object of the present invention is to provide a new engine valve lifter lifting tool that simplifies camshaft replacement to save time during engine repairs.

To this end, the present invention generally comprises a plate having a plurality of rods each snugly inserted through a respective alignment tube to permit selective positioning of each rod within the respective alignment tube. Each rod includes a magnet to engage one of the valve lifters to hold the lifter clear of the camshaft. A respective plunger assembly is attached to each rod to detach the lifter from the magnet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
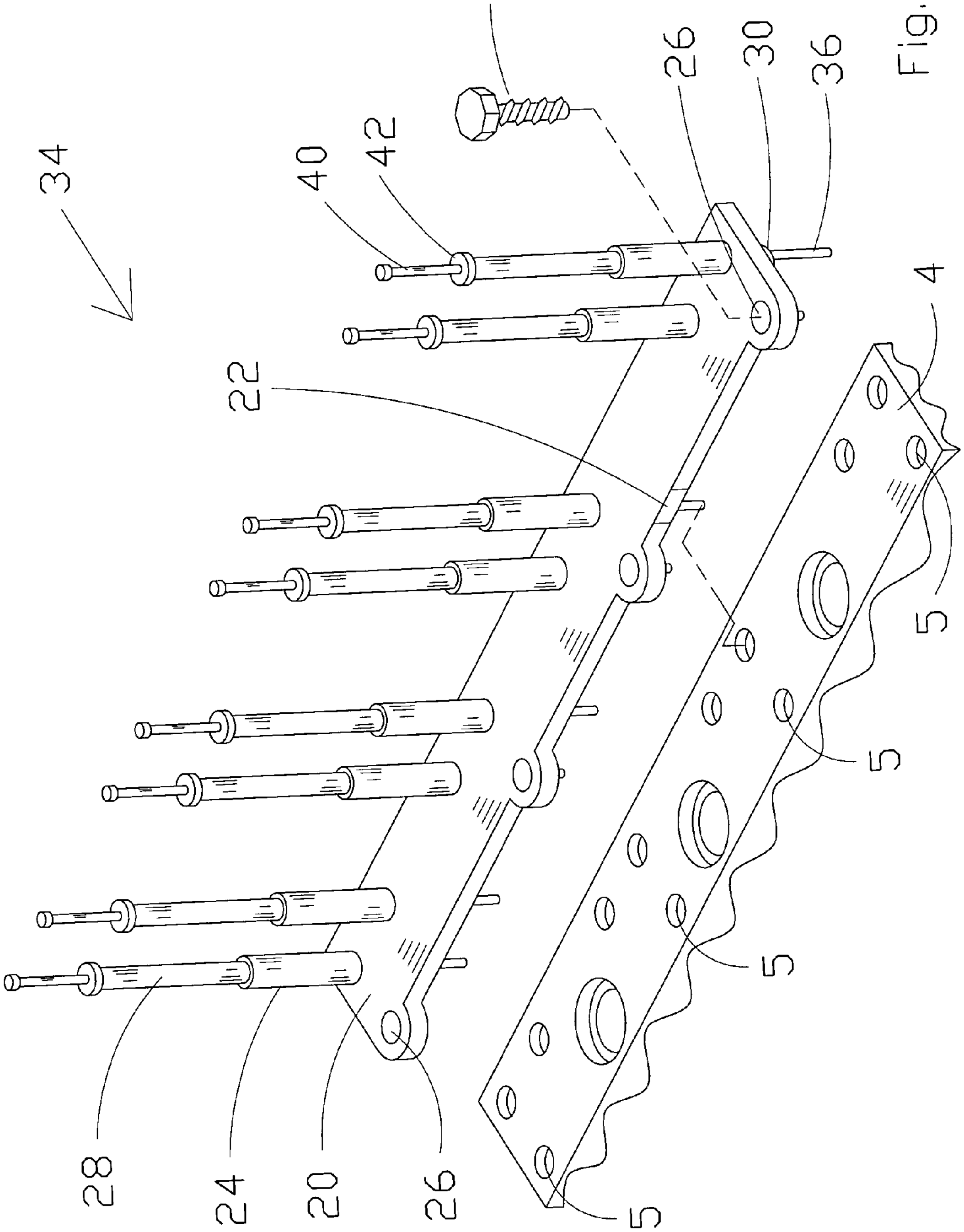
FIG. 1 is a perspective view of a new engine valve lifter lifting tool according to the present invention.
Figure 2:
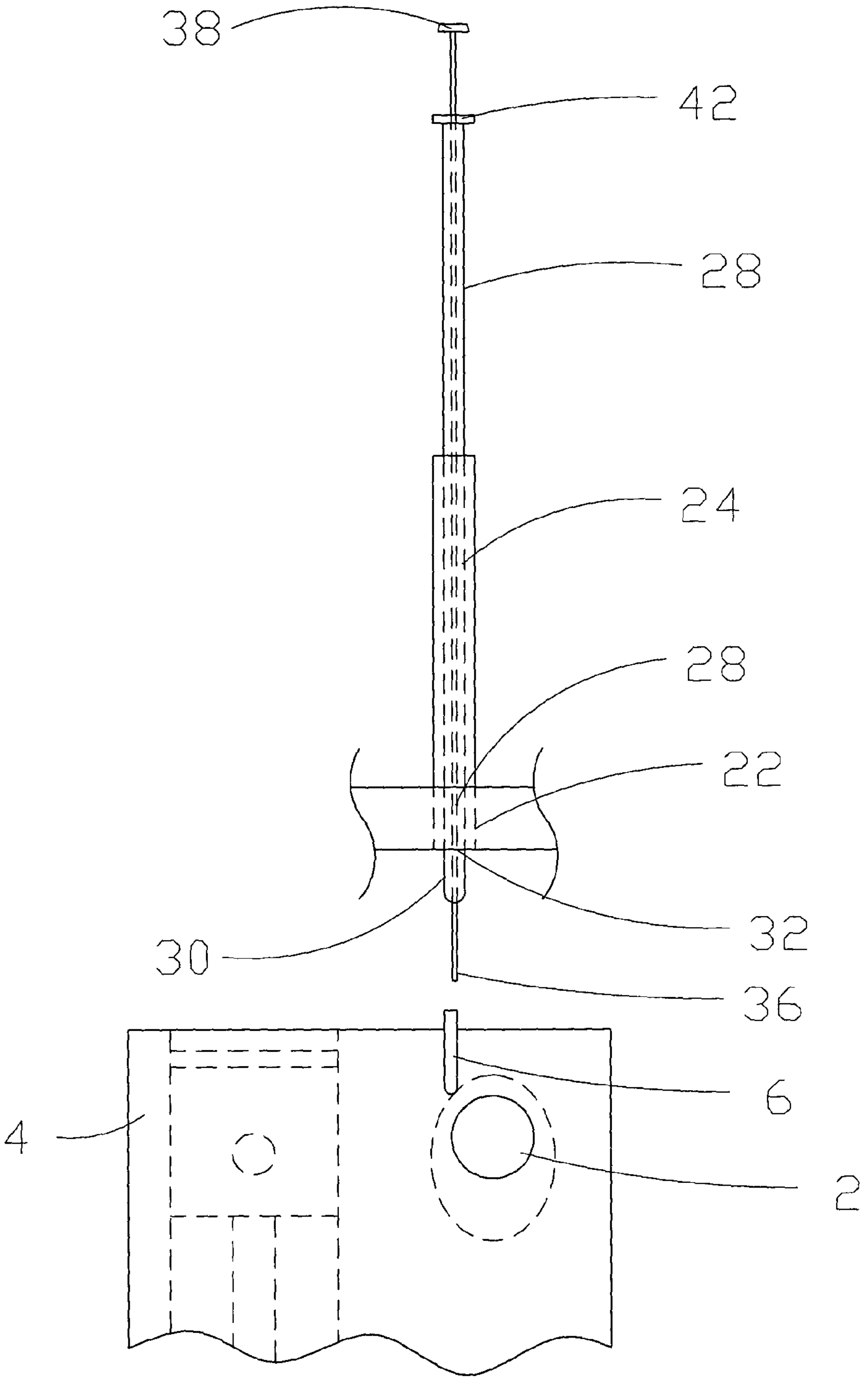
FIG. 2 is a schematic side view of the present invention.

With reference now to the drawings, and in particular to FIGS. 1 and 2 thereof, a new engine valve lifter lifting tool embodying the principles and concepts of the present invention and generally designated by the reference numeral 10 will be described.

As best illustrated in FIGS. 1 and 2, the engine valve lifter lifting tool 10 facilitates removal and installation of a camshaft 2 of an internal combustion engine 4 by clearing valve lifters 6 of the engine 4 from the camshaft 2. The engine valve lifter lifting tool 10 generally comprises a plate 20 having a plurality of apertures 22. A plurality of alignment tubes 24 are coupled to the plate 20. Each of the alignment tubes 24 is aligned with an associated one of the plurality of apertures 22. The plate includes at least one attachment hole 26 that is positioned on the plate 20 such that the plate 20 is designed for being coupled to the engine 4 by insertion of a bolt 3 through the attachment hole 26 and into a threaded opening 5 in the engine 4. The attachment hole positioning may vary depending on the arrangement of the engine being repaired or refurbished.

A plurality of rods 28 are provided. Each of the rods 28 is snugly inserted through a respective one of the alignment tubes 24 to permit selective positioning of each rod 28 within the respective one of the alignment tubes 24. A plurality of magnets 30 are also provided. Each magnet 30 is coupled to a bottom 32 of an associated one of the rods 28 to engage an associated one of the valve lifters 6 to hold the valve lifter 6 clear of the camshaft 2.

A plurality of plunger assemblies 34 are provided. Each plunger assembly 34 is coupled to an associated one of the rods 28. Each plunger assembly 34 has a base portion 36 extendable through the magnet 30 coupled to the bottom 32 of the associated rod 28 to detach the associated valve lifter 6 from each magnet 30 upon utilization of each plunger assembly 34.

In an embodiment, each rod 28 is constructed of plastic, the base portion 36 of the plunger assembly 34 is constructed of brass, and the plate 20 is constructed of plastic.

The plunger assembly 34 includes a head portion 38 and an elongated plunger portion 40 extending from the head portion 38.

Each rod 28 includes a lip 42 positioned at a top 44 of the rod 28 for facilitating manipulation of the rod 28 and the head portion 38 simultaneously to move the base portion 36 of the plunger assembly 34.

In an embodiment, each rod has an outer diameter of 5/16 inches, and inner diameter of 0.098 inches for permitting passage of the plunger assembly, and the outer diameter of the plunger portion of the plunger assembly is 0.096 inches. The magnet has a depth of about 3/8 inches and a diameter equal to the outer diameter of the rod.

In use, the plate is attached to the engine block, preferably using multiple points to prevent movement of the plate during repairs. Each rod is positioned in sufficient proximity to an associated valve lifter that the magnet engages the aligned valve lifter. Each rod is positioned within the alignment tube relative to the plate sufficient to hold the valve lifter in a position clear of the camshaft of the engine. The camshaft is then free to be replaced as desired. After installation of the new or repaired camshaft, each plunger assembly is used by placing fingers and thumb on the lip and head portion to squeeze them together thus urging the base portion of the plunger assembly through the magnet. The base of the plunger assembly extends sufficiently from the magnet such that the magnetic force is no longer sufficient to keep the valve lifter engaged to the magnet. Thus, the valve lifter is free and returns to it's position engaging the new or repaired camshaft. After each valve lifter is freed, the plate is removed from the engine block.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An engine valve lifter lifting tool for facilitating removal and installation of a camshaft of an internal combustion engine by clearing a valve lifter of the engine from the camshaft, said engine valve lifter lifting tool comprising:

a plate having an aperture;

an alignment tube coupled to said plate, said alignment tube being aligned with said aperture;

a rod, said rod being snugly inserted through said alignment tube to permit selective positioning of said rod within said alignment tube;

a magnet, said magnet being coupled to a bottom of said rod to engage the valve lifter to hold the valve lifter clear of the camshaft when said rod is in a raised position;

wherein said plate includes an attachment hole, said attachment hole being positioned on said plate such that said plate is adapted for being coupled to the engine by insertion of a bolt through said attachment hole and into a threaded opening in the engine.

2. An engine valve lifter lifting tool for facilitating removal and installation of a camshaft of an internal combustion engine by clearing a valve lifter of the engine from the camshaft, said engine valve lifter lifting tool, comprising:

a plate having an aperture;

an alignment tube coupled to said plate, said alignment tube being aligned with said aperture;

a rod, said rod being snugly inserted through said alignment tube to permit selective positioning of said rod within said alignment tube;

a magnet, said magnet being coupled to a bottom of said rod to engage the valve lifter to hold the valve lifter clear of the camshaft when said rod is in a raised position;

a plunger assembly, said plunger assembly being coupled to said rod, said plunger assembly having a base portion extendable through said magnet to detach the lifter from said magnet upon utilization of said plunger assembly.

3. An engine valve lifter lifting tool for facilitating removal and installation of a camshaft of an internal combustion engine by clearing valve lifters of the engine from the camshaft, said engine valve lifter lifting tool comprising:

a plate having a plurality of apertures;

a plurality of alignment tubes coupled to said plate, each of said alignment tubes being aligned with an associated one of said plurality of apertures;

a plurality of rods, each of said rods being snugly inserted through a respective one of said alignment tubes to permit selective positioning of each rod within said respective one of said alignment tubes;

a plurality of magnets, each magnet being coupled to a bottom of an associated one of said rods to engage an associated one of the valve lifters to hold the valve lifter clear of the camshaft.

4. The engine valve lifter lifting tool of claim 3, further comprising:

a plurality of plunger assemblies, each plunger assembly being coupled to an associated one of said rods, each plunger assembly having a base portion extendable through said magnet coupled to said bottom of said associated rod to detach the associated lifter from each said magnet upon utilization of each said plunger assembly.

5. The engine valve lifter lifting tool of claim 3, further comprising:

said plate including an attachment hole, said attachment hole being positioned on said plate such that said plate is adapted for being coupled to the engine by insertion of a bolt through said attachment hole and into a threaded opening in the engine.

6. The engine valve lifter lifting tool of claim 1 wherein said rod is constructed of plastic.

7. The engine valve lifter lifting tool of claim 2 wherein said base portion of said plunger assembly is constructed of brass.

8. The engine valve lifter lifting tool of claim 2 wherein said plunger assembly includes a head portion and an elongated plunger portion extending from said head portion.

9. The engine valve lifter lifting tool of claim 8 wherein said rod includes a lip positioned at a top of said rod for facilitating manipulation of said rod and said head portion simultaneously to move said base portion of said plunger assembly.

10. The engine valve lifter lifting tool of claim 1 wherein said plate is plastic.

11. The engine valve lifter lifting tool of claim 3 wherein each of said rods is constructed of plastic.

12. The engine valve lifter lifting tool of claim 3 wherein said plate is plastic.

13. The engine valve lifter lifting tool of claim 1, further comprising:

a plurality of plunger assemblies, each plunger assembly being coupled to an associated one of said rods, each plunger assembly having a base portion extendable through said magnet coupled to said bottom of said associated rod to detach the associated lifter from each said magnet upon utilization of each said plunger assembly.

14. The engine valve lifter lifting tool of claim 1 wherein said rod includes a lip positioned at a top of said rod for facilitating manipulation of said rod and said head portion simultaneously to move said base portion of said plunger assembly.

15. The engine valve lifter lifting tool of claim 3 wherein each of said rods includes a lip positioned at a top of said rod for facilitating manipulation of said rod and said head portion simultaneously to move said base portion of said plunger assembly.

* * * * *